(12) United States Patent
    Ciuca et al.

(10) Patent No.:    US 12,567,332 B2
(45) Date of Patent:      Mar. 3, 2026

(54) METHOD OF COLLISION POINT CALCULATION AND EMERGENCY BRAKE ASSIST DECELERATION BASED ON THE METHOD OF COLLISION POINT CALCULATION

(71) Applicant: Continental Autonomous Mobility Germany GmbH, Ingolstadt (DE)

(72) Inventors: Mihai Marius Ciuca, Ramnicu-Valcea (RO); Paul Cristian Bucataru, Selimbar (RO); Matthias Lorenzen, Ravensburg (DE); Andreas Kramer, Sigmaringen (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 289 days.

(21) Appl. No.: 18/304,709

(22) Filed: Apr. 21, 2023

(65) Prior Publication Data

US 2023/0343217 A1     Oct. 26, 2023

(30) Foreign Application Priority Data

Apr. 21, 2022    (EP) ..................................... 22465527

(51) Int. Cl.
    *G08G 1/16*        (2006.01)
    *G01S 13/931*      (2020.01)

(52) U.S. Cl.
    CPC ............ *G08G 1/166* (2013.01); *G01S 13/931* (2013.01); *G01S 2013/93185* (2020.01); *G01S 2013/9321* (2013.01)

(58) Field of Classification Search
    CPC .................. G08G 1/166; G01S 13/931; G01S 2013/93185; G01S 2013/9321; B60W 50/0097
    See application file for complete search history.

(56) References Cited

U.S. PATENT DOCUMENTS 10,510,255 B2 * 12/2019   Foltin ................. B60W 60/007
11,964,652 B2 *  4/2024   Lang ................... B60W 30/085
(Continued)

FOREIGN PATENT DOCUMENTS

GB        2536116 A      9/2016
WO    2015040634 A2    3/2015
WO    2020250019 A1   12/2020

OTHER PUBLICATIONS

Search Report from the Intellectual Property Office of Great Britain dated Oct. 26, 2022 for the counterpart GB Application No. 2206205. 3.

(Continued)

*Primary Examiner* — Christian Chace
*Assistant Examiner* — Minato Lee Horner

(57)            ABSTRACT

A method of calculating a collision point between an ego vehicle and a target vehicle and to emergency-brake-assist deceleration using the calculation. The calculation defines areas of collision risk of the ego vehicle, determines movement of the ego and target vehicle, calculates times-to-collision for first and second ego-vehicle intersecting points and a target-vehicle intersecting point to an intersection point. A risk collision point condition establishes that the collision point is inside an ego vehicle area if the first time-to-collision for the first ego-vehicle intersecting point reaching the intersection point is less than a third time-to-collision for the target-intersection point reaching the inter-section point, and the second time-to-collision for the second ego-vehicle intersecting point reaching the intersection point is greater than the third time-to-collision for the target intersection point reaching the intersection point. A deceleration level is selected based on the collision points satis-fying the risk collision point condition.

13 Claims, 5 Drawing Sheets

(56)          References Cited

U.S. PATENT DOCUMENTS

| 2014/0039786 | A1 |   | 2/2014 | Schleicher |   |
|---|---|---|---|---|---|
| 2016/0052515 | A1 |   | 2/2016 | Choi et al. |   |
| 2017/0274876 | A1 |   | 9/2017 | Kim |   |
| 2019/0073904 | A1 | * | 3/2019 | Heinla | G05D 1/0223 |
| 2021/0114591 | A1 | * | 4/2021 | Kamiya | B60W 30/09 |
| 2022/0144253 | A1 | * | 5/2022 | Weiss | B60W 30/0956 |

OTHER PUBLICATIONS

Jimenez et al., "An Improved Method to Calculate the Time-to-Collision of Two Vehicles," International Journal of Intelligent Transportation Systems Research, pp. 34-42, DOI: 10.1007/s13177012-0054-4 (2013).
European Search Report dated Sep. 20, 2023 for the counterpart European Patent Application No. 23168544.7.

* cited by examiner area of major collision risk area of major collision risk area of major collision risk B - pillar A - pillar area of major collision risk Discretized areas of major collision risk Discretized areas of major collision risk B - pillar A - pillar area of major collision risk area of major collision risk

A

B

C

D area of major collision risk

METHOD OF COLLISION POINT CALCULATION AND EMERGENCY BRAKE ASSIST DECELERATION BASED ON THE METHOD OF COLLISION POINT CALCULATION

CROSS REFERENCE TO RELATED APPLICATION

The present application claims the benefit and priority of European Patent Application No. 22465527.4, filed on Apr. 21, 2022, the content of which is incorporated by reference herein.

FIELD OF INVENTION

The present invention relates to advanced driver assistance systems ADAS. In particular the invention relates to a method of calculation of a collision point between two vehicles and emergency brake assist deceleration based on the point calculation.

BACKGROUND

Road accidents reduction is one of the most important problem the automotive industry is trying to solve.

A considerable reduction of accidents have occurred since the introduction and progress of the advanced driver assistance systems ADAS because these systems have a major contribution in the avoidance of a significant part of the collisions by predicting them and by taking actions.

A good categorization of the modern safety systems is made in the 2013 paper of Jiménez et. al ("An Improved Method to Calculate the Time-to-Collision of Two Vehicles," International Journal of Intelligent Transportation Systems Research," pp. 34-42, DOI: 10.1007/s13177012-0054-4): primary safety systems, secondary safety systems and pre-collision systems overlapping the first ones. According to the authors: "pre-collision systems seek benefits such as reducing the number of accidents and their severity, responding to risk situations and adapting safety measures to the vehicle's occupants and characteristics of the collision" and "one key aspect in these systems is the decision whether a collision is unavoidable or not".

The Jiménez et. al paper presents a detailed explanation of the possible accident configurations when two vehicles collide, based on the author's observation that "when two vehicles crash, it can be seen that the corner of one of them is the first area that comes into contact". The authors identify "only 10 accident configurations" as possible when one of the vehicles collide with its corner, the categorization of which depends on two factors: on the angle α between the motion vectors of both vehicles, and on the part of the other vehicle that collides with said corner: either the corner hits the side of another vehicle, or the corner hits the front or the rear part. Further on, the authors make detailed calculations of the time to collision between the two vehicles for each of the 10 accident configurations.

SUMMARY

The inventors observed that side collisions account for the second highest frequency of death and serious injuries.

In the description of invention, the term "pillars" refer to the vertical or substantial vertical supports of a vehicle's roof and surround the glazed areas. For a passenger car, they are designated as the A, B, C or D-pillar respectively, from the front to rear of the vehicle, as seen in FIG. 1c.

In particular, with reference to FIG. 1c, the side collision hitting the portion between the A-pillar and B-pillar corresponding to the seat of the driver is the culprit for the most severe injuries, because, compared with a frontal impact, there is very little space inside the vehicle's interior to absorb the energy of the collision leading to injuries to the head and the chest of the driver or the right-side passenger.

With this in mind, the inventors observed that the state of the art in general and the Jiménez et. al paper in particular do not deal specifically with calculations and actions to improve the prevention of side crashes, especially the side collision hitting the B-pillar corresponding to the seat of the driver.

Starting from the example of the side collisions, the inventors observed that, in the state of the art, there is no rank of the collision risk on the sides of the vehicle. In other words, all the calculations are based on the collision of the ego vehicle with the target somewhere on one side of the ego vehicle: front, rear, one or the other lateral side or one of the four corners. The inventors believe that it's a first disadvantage of prior art the absence of the rank of the collision risk because the collisions with more vulnerable parts of the vehicles produce more serious damages than others.

A second disadvantage of prior art is that the emergency brake assist systems of the vehicles, when confronted with an imminent crash, automatically apply, in general, a full brake, using maximum deceleration possible. In some of these situations, by a applying a full brake, the collision of the vehicles takes place exactly in the most vulnerable parts of one of them, such as the side and in particular the portion between the A-pillar and the B-pillar.

The technical problem to be solved is to define one or more areas of major collision risk for the ego vehicle and to improve the calculation of collision points between the ego vehicle and the target vehicles when the collision affects the one or more areas of major collision risk and to improve the deceleration maneuver of the ego vehicle based on the calculation of the collision points.

In order to overcome the disadvantages of prior art, in a first aspect of the present disclosure it is presented a method of calculation of a collision point between an ego vehicle and one or more target vehicles, including seven steps, the method carried out by a collision point processing unit as follows: one or more areas of major collision risk of the ego vehicle are defined, each of the one or more areas of major collision risk delineated by a corresponding pair of a first and a second substantial verticals positioned on a respective pair of two opposite sides of the ego vehicle. Furthermore, prediction of the movement of the ego vehicle is defined together with a prediction of the movement of a plurality of surrounding traffic participants during a pre-determined prediction time period. Afterwards, the surrounding traffic participants that are unlikely to collide with the ego vehicle during the pre-determined prediction time period are filtered out, the remainder of the traffic participants being the one or more target vehicles. Moreover, a target intersecting point is determined for each target vehicle as one of the four corners of the target vehicle that is most likely to collide with the ego vehicle, and an intersection point is defined by the prolongation line of the side of ego vehicle intersected with the prolongation line of the side of the target vehicle on the respective intersecting sides of the two vehicles. Simultaneously, a first ego vehicle intersecting point and a second ego vehicle intersecting point are determined in respect to each target vehicle, the first ego vehicle intersecting point corresponding to the first substantial vertical positioned nearest to the target intersecting point and the second ego vehicle intersecting point corresponding to the second substantial vertical positioned farthest from the target intersecting point. Further on, for each target vehicle the following are calculated: a first time to collision for the first ego vehicle intersecting point to reach the intersection point, a second time to collision for the second ego vehicle intersecting point to reach the intersection point, a third time to collision for the target intersection point to reach the intersection point.

Further on, a major risk collision point condition is applied: the collision point is inside one of the areas of the ego vehicle if the major risk collision point condition is satisfied: the first time to collision for the first ego vehicle intersecting point to reach the intersection point I is less than the third time to collision for the target intersection point to reach the intersection point, and the second time to collision for the second ego vehicle intersecting point to reach the intersection point I is greater than the third time to collision for the target intersection point to reach the intersection point.

Furthermore, all the collision points for which the major risk collision point condition is satisfied are sent to an actuation unit.

In a second aspect of the present disclosure it is presented a method of emergency brake assist deceleration of an ego vehicle using the calculation of a collision point between the ego vehicle and one or more target vehicles, the method carried out by an actuation unit, the method including four steps as follows: a plurality of levels of deceleration are defined, each level of deceleration corresponding to one of the areas of major collision risk and each level of deceleration is lower than the maximum deceleration. Then, an activation threshold is set to activate the method when the actuation unit receives from the collision point processing unit the collision points for which the major risk collision point condition is satisfied. Further, when the activation threshold is activated, it is selected from the plurality of levels of deceleration the level of deceleration corresponding to one of the areas of major collision risk for which the major risk collision point condition is satisfied, and the selected level of deceleration is applied.

In a third aspect of the present disclosure, it is presented a collision point processing unit including one or more processors, at least one non-volatile memory and a first non-transitory computer-readable storage medium, the collision point processing unit being configured to perform operations of the method of calculation of a collision point between an ego vehicle and one or more target vehicles of any embodiment.

In a fourth aspect of the present disclosure, it is presented an actuation unit including one or more processors, at least one non-volatile memory, at least one emergency brake actuator and a second non-transitory computer-readable storage medium, wherein the actuation unit is configured to perform operations of the method emergency brake assist deceleration of an ego vehicle of any embodiment.

In a fifth aspect of the present disclosure, it is presented a first non-transitory computer-readable storage medium encoded with a first computer program, the first computer program including instructions executable by one or more processors of the collision point processing unit which, upon such execution by the collision point processing unit, causes the one or more processors to perform operations of the method of calculation of a collision point between an ego vehicle and one or more target vehicles of any embodiment.

In a sixth aspect of the present disclosure, it is presented a second non-transitory computer-readable storage medium encoded with a second computer program, the second computer program including instructions executable by one or more processors of the actuation unit which, upon such execution by the actuation unit, causes the one or more processors to perform operations of the method emergency brake assist deceleration of an ego vehicle of any embodiment.

In a seventh aspect of the present disclosure, it is presented a system, including a collision point processing unit, an actuation unit, a sensor unit of an ego vehicle including a plurality of sensors, the system configured to apply the method of calculation of a collision point between an ego vehicle and one or more target vehicles of any embodiment and the method of emergency brake assist deceleration of any embodiment.

Further advantageous embodiments are the subject matter of the dependent claims.

The main advantages of using the present disclosure are as follows:

By defining one or more areas of major collision risk, it is possible to focus the prevention actions of the modern safety systems on those most vulnerable areas of the vehicles that are more likely to suffer injuries with severe consequences, By improving the calculation of the collision point, the present disclosure provides the advanced driver assistance systems (ADAS) with the possibility to learn better which are the most vulnerable areas to collision, so that the driver and/or advanced driver assistance systems (ADAS) can adopt more effective and customized measures to avoid the collision depending on the degree of importance of the collision risk, By improving the deceleration manoeuvre of the ego vehicle based on the calculation of the collision point, the present disclosure improves the avoidance of the side crashes for both the ego vehicle and the target, The method of the present disclosure is robust allowing to easily fit into the majority of the embedded systems without requiring high memory or high processing power, which makes it highly affordable.

BRIEF DESCRIPTION OF THE DRAWINGS

Further special features and advantages of the present disclosure can be taken from the following description of an advantageous embodiment by way of the accompanying drawings:

FIG. 2a illustrates the initial situation, FIG. 2b illustrates the prediction made by the prediction model.

DETAILED DESCRIPTION

The method of calculation of a collision point of the first aspect of the present disclosure has seven steps and is carried out by a collision point processing unit of the ego vehicle. Step 1.1

Figure 1A:
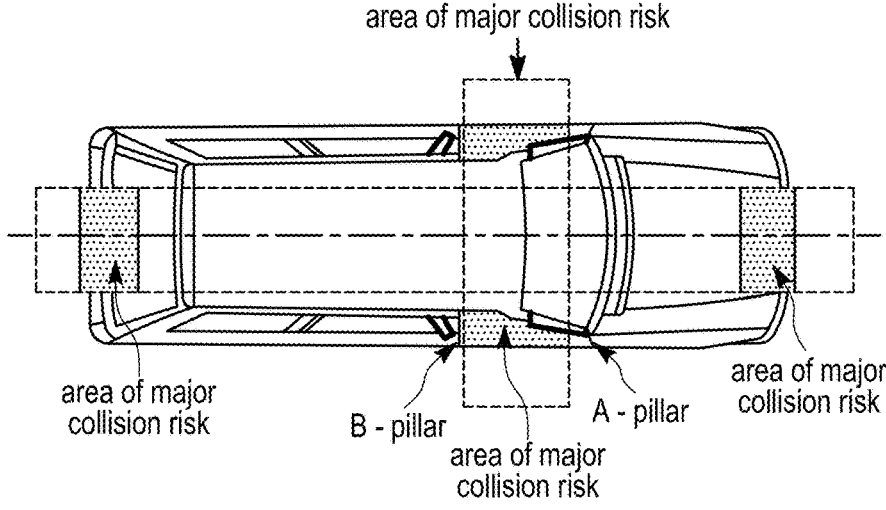
FIG. 1a illustrates schematically the concept of the areas of major collision risk in a top view of the ego vehicle with emphasis on the area of major collision risk between the A-pillar and the B-pillar.
Figure 1B:
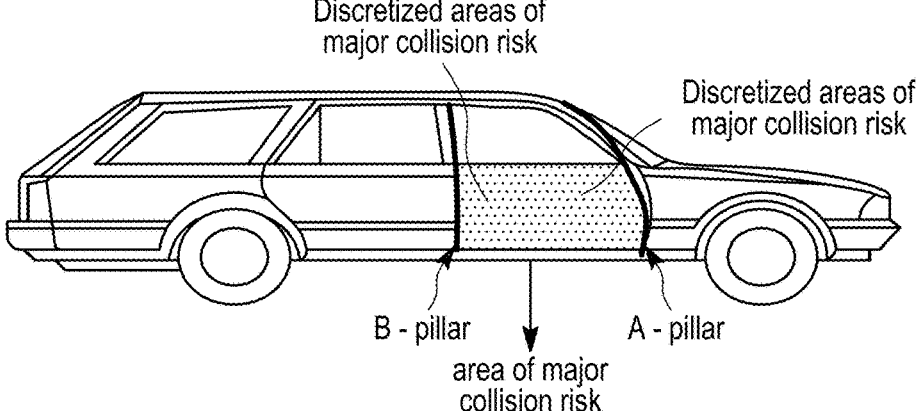
FIG. 1b illustrates schematically the concept of the areas of major collision risk in a side view of the ego vehicle with emphasis on the area of major collision risk between the A-pillar and the B-pillar.
Figure 1C:
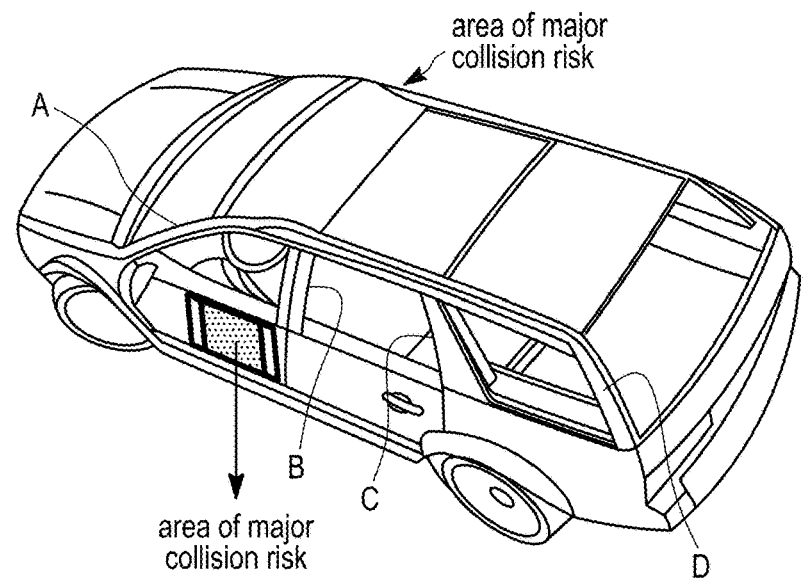
FIG. 1c illustrates an embodiment when the vehicle is a passenger car and the area of major collision risk are delineated by the A and B pillars of the passenger car.

With reference to FIG. 1a, FIG. 1b, FIG. 1c, in step 1.1, one or more areas of major collision risk of the ego vehicle are defined. Each area of major collision risk is delineated by a corresponding pair of first and second substantial verticals positioned on a respective pair of two opposite sides of the ego vehicle.

Since the ego vehicle has two axes, namely the longitudinal axis and the transverse axis, it has four sides grouped in two pairs of opposite sides: one pair referring to two opposite lateral sides placed symmetrically in respect to the longitudinal axis and another pair in the front and the rear part placed symmetrically in respect to the transverse axis. Thus, in this present disclosure, each area of major collision risk is in two identical areas placed opposite one to another symmetrically in respect to the respective axis of the ego vehicle.

The reason of defining the one or more areas of major collision risk is to identify better than in the state of the art which are the most vulnerable areas in case of collision for each type of ego vehicle.

The definition of the one or more areas of major collision risk is carried out by means of a plurality of sensors of a sensory unit. The sensors are placed according to known methods.

In an embodiment, the one or more areas of major collision risk are defined in respect to the longitudinal axis of the ego vehicle, thus they are placed on the lateral sides of the ego vehicle. This corresponds to the major concern that the lateral sides are very vulnerable to crashes.

In an alternative embodiment, the one or more areas of major collision risk are defined in respect to the transverse axis of the ego vehicle, thus they are placed on the front side and on the rear side of the vehicles. This corresponds to an example in which frontal crashes are very frequent (e.g., vehicles sold in countries with meteorological conditions that impair good visibility for many months in a year: fog, darkness).

In another embodiment, one or more areas of major collision risk are defined in respect to both the longitudinal axis and to the transverse axis of the ego vehicle, by this combining the advantages of the previous two embodiments.

For the situations when the one or more areas of major collision risk are defined in respect to the longitudinal axis, in another embodiment, the first and the second substantial verticals support the vehicle's roof, corresponding to pillars of the ego vehicle.

For the embodiments where the first and the second substantial verticals correspond to the pillars of the ego vehicle, a particular example is the case when the ego vehicle is a passenger car.

In this particular case, the one or more areas of major collision risk are defined as follows: between an A-pillar and a B-pillar of the passenger car, the first substantial vertical corresponding to the A-pillar and the second substantial vertical corresponding to the B-pillar, the two substantial verticals surrounding a driver's seat on one lateral side of the ego vehicle and a front passenger seat on the other lateral side of the passenger car; or between the B-pillar and a C pillar of the passenger car, the first substantial vertical corresponding to the B-pillar and the second substantial vertical corresponding to the C-pillar, the two substantial verticals surrounding back passenger seats; or between the A-pillar and the B-pillar of the passenger car, and between the B-pillar and the C pillar of the passenger car.

The choice of the number of areas of major collision risk and their positioning depends on the particulars of each passenger car as well as on other reasons of the manufacturer, such as but not limited to the particulars of the weather conditions, the statistics in respect to the number of crashes, their localization on the sides of the passenger car, and the percentage of serious injuries, all particulars referring to the country where the respective passenger car is used most time of the year.

The steps 1.2-1.7 of the first aspect of the present disclosure are detailed in respect to an example of realization where the ego vehicle is a passenger car and, for simplicity, there is a single area of major collision risk delineated by the A and B pillars of the ego vehicle, as shown in FIG. 1b. It shall be understood that the simplified example of realization was considered for the ease of understanding of the method of the first aspect of the present disclosure and not for limiting same to the example.
Step 1.2

Figure 2A:
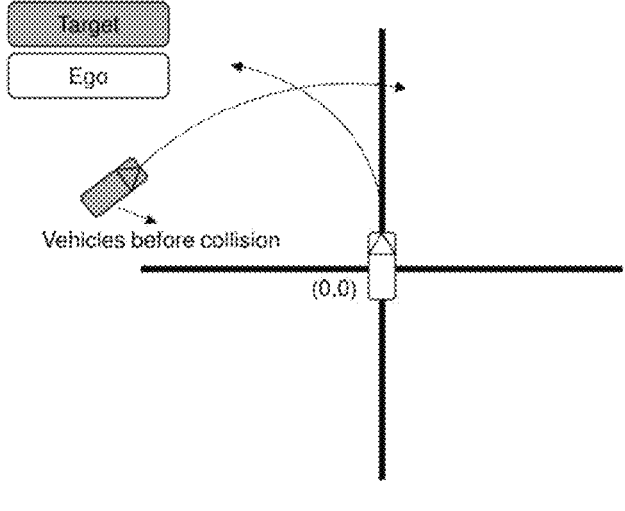
FIG. 2a, 2b illustrates the prediction step of the movement of the ego vehicle and the target, namely
Figure 2B:
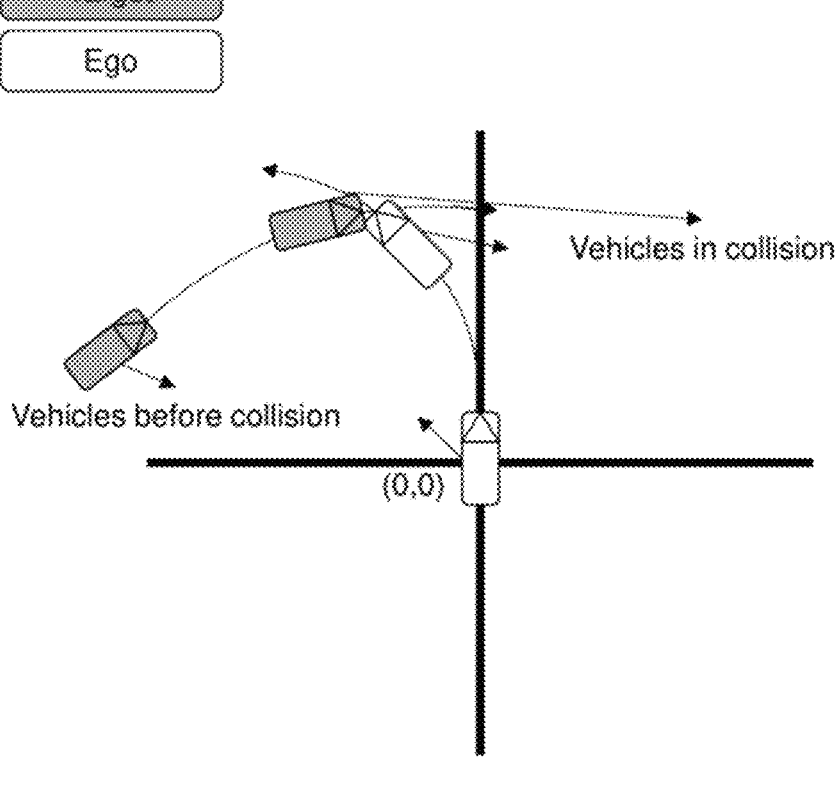

In step 1.2., with reference to FIG. 2a and FIG. 2b, a prediction is defined of the movement of the ego vehicle and of a plurality of surrounding traffic participants during a pre-determined prediction time period. The prediction is based on a motion prediction model, selected among a variety of motion prediction models. For example, a generic environmental prediction model EPM can be used.

A non-limiting example would be the determination of the pre-determined prediction time period based by on a radar determination rate, typically ranging between 0.3-0.6 ms, the rate not necessarily being constant. The value of the radar determination rate is not limiting the invention to the afore-mentioned range.

As it can be seen in Jiménez et. al cited above, the predicted movements use linear straight paths. However, in most systems nowadays, prediction models use curved paths. It is possible to integrate contact point calculation logic in any environmental prediction model EPM that uses a different trajectory prediction. There are numerous kinematic models which describe the movement of traffic participants, e.g., kinematic unicycle/bicycle. Usually, prediction models do not use continuous function, since it is not feasible to store an 'infinite' number of predicted states, and they are sample based. The environmental prediction model EPM will predict the movement of the ego vehicle and target vehicle starting with the current timestamp, until the ego vehicle and target vehicle are very close, the meaning of "very close" being also defined in the environmental prediction model EPM. For example:

FIG. 2a—traffic situation with ego+target at the current timestamp,

FIG. 2b—traffic situation with ego+target after prediction movement using the environmental prediction model EPM.

This leads to the following remarks:

the intersection point I is independent of the environmental prediction model

EPM, so it could be configured taking as input the traffic situation from any environmental prediction model EPM after the predicted movement, the approximation of the curved path using a straight line would introduce errors of a very small magnitude. Considering a small distance between target+ego after the environmental prediction model EPM prediction (e.g.: ~0.1-0.3 meters), using a small straight line to approximate an arc length would introduce unnoticeable errors (e.g., ~0.2 m straight lines provides a very good approximation of an arc length, introducing errors of $<\sim$0.01 m).

Step 1.3

In step 1.3, not represented graphically, the surrounding traffic participants that are unlikely to collide with the ego vehicle during the pre-determined prediction time period are filtered out. The filtering out is carried out using usual methods of calculation of collision for removing all the surrounding traffic participants that are moving away from the ego vehicle.

The remaining traffic participants after the filtering out are those for which there is a real likelihood to collide with the ego vehicle, namely the target vehicles. The method will be thus applied individually for each of the target vehicles.

Step 1.4

In step 1.4, in case of collision of the ego vehicle with the target vehicle, an intersection point I is determined by the prolongation line of the side of the ego vehicle with the prolongation line of the side the target vehicle on the respective intersecting sides of the two vehicles.

Figure 3:
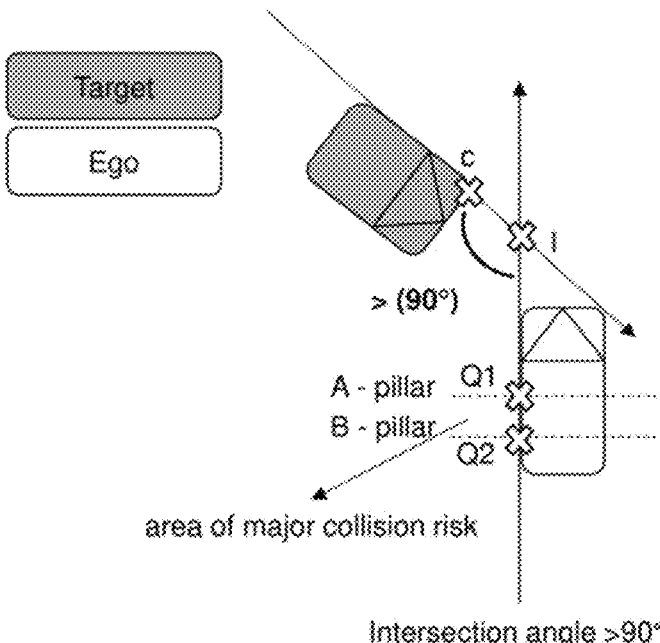
FIG. 3 illustrates the set-up of the method of the present disclosure when the intersection angle is >90° and the defining of the area of major collision risk between the A-pillar and the B-pillar.
Figure 4:
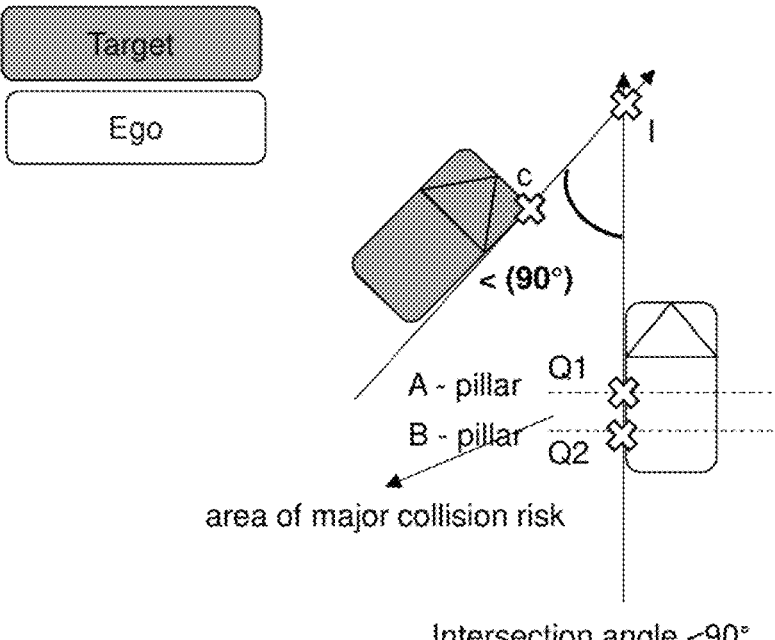
FIG. 4 illustrates the set-up of the method of the invention when the intersection angle is <90° and the defining of the area of major collision risk between the A-pillar and the B-pillar.

For example, in FIG. 3, the two prolongation lines are situated at the left-hand side of each of the vehicles because the intersecting sides of both vehicles are at the left-hand side in respect to the direction of motion, whereas in FIG. 4 the prolongation line of the ego vehicle is situated at the left-hand side, whereas the prolongation line of the target vehicle is situated at the right-hand side, because the respective intersecting sides are opposite: left-hand side for the ego vehicle with the right-hand side for the target vehicle.

At the same time with the definition of the intersection point I, a target intersecting point C is determined for each target vehicle, determined for each target vehicle as one of the four corners of the respective target vehicle that is most likely to collide with the ego vehicle, and an intersection point is defined by the prolongation line of the side of ego vehicle intersected with the prolongation line of the side of the target vehicle on the respective intersecting sides of the two vehicles.

The prolongation line of the side of ego vehicle and the prolongation line of the side of the target vehicle on the respective intersecting sides of the two vehicles defines an angle. For example, in FIG. 3, the angle is larger than 90°, which means that target intersecting point C is the left corner of the target vehicle, whereas in FIG. 4, the angle is smaller than 90°, which means that the target intersecting point C is the right corner of the target vehicle.

Simultaneously, for each target vehicle, two ego vehicle intersecting points are determined: a first ego vehicle intersecting point Q1, the first ego vehicle intersecting point Q1 corresponding to the first substantial vertical positioned nearest to the intersection point I, and a second ego vehicle intersecting point Q2, the second ego vehicle intersecting point Q2 corresponding to the second substantial vertical positioned farthest from the intersection point I.

Taking again the example of FIG. 3, the target vehicle intersecting point is the left corner of the ego vehicle, whereas in FIG. 4, the target vehicle intersecting point is the right corner of the ego vehicle.

Step 1.5

In step 1.5. calculations are carried out for each target vehicle:

a first time to collision TTC_Q1I for the first ego vehicle intersecting point Q1 to reach the intersection point I, a second time to collision TTC_Q2I for the second ego vehicle intersecting point Q2 to reach the intersection point I, a third time to collision TTC_CI for the target intersection point C to reach the intersection point I. The calculation of the times to collision can be carried out according to any accepted formula of calculation.

Step 1.6

In step 1.6 it is checked for each target vehicle if, in case of collision of the respective target vehicle with the ego vehicle, the collision point is inside one of the areas of major collision risk. Taking again the example of FIG. 1b, this step seeks to check if the collision point falls within the area of major risk defined by the A-pillar and the B-pillar. In the affirmative, this means that there is an additional risk of injury for the driver and/or the front passenger seat.

The collision point is inside one of the areas of major collision risk if a major risk collision point condition is satisfied, the major risk collision point condition being applied as follows: the first time to collision TTC_Q1I for the first ego vehicle intersecting point Q1 to reach the intersection point I must be less than the third time to collision TTC_CI for the target intersection point C to reach the intersection point I, which means that the first ego vehicle intersecting point Q1 will reach the intersection point I before the target vehicle reaches the target intersecting point C, and the second time to collision TTC_Q2I for the second ego vehicle intersecting point Q2 to reach the intersection point I must be greater than the third time to collision TTC_CI for the target intersection point C to reach the intersection point I, which means that the target intersecting point C will reach the intersection point I after the second ego vehicle intersecting point Q2.

If the major risk collision point condition is not satisfied, the collision point is placed outside one or more areas of major collision risk.

Figure 5:
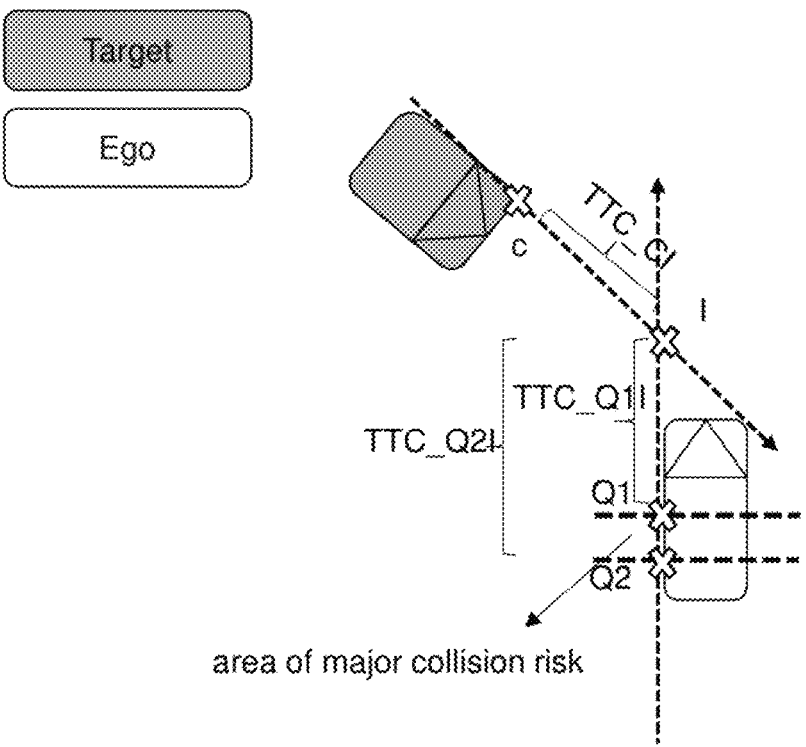
FIG. 5 illustrates a detail of the FIG. 3 with the calculation of the times of collision.

FIG. 5 details the situation of FIG. 3, illustrating the principles of the calculation of the collision point. The time to collision TTC is calculated for all the three intersection points: the first time to collision TTC_Q1I for the first ego vehicle intersecting point Q1: time to reach from 01 to the intersection point I; the second time to collision TTC_Q2I for the second ego vehicle intersecting point Q2: time to reach from Q2 to the intersection point I; the third time to collision TTC_CI for the target intersection point C: time to reach to from C to the intersection point I.

The collision point is situated inside between the A-pillar and the B-pillar section if the major risk collision point condition is fulfilled:

$$(TTC\_Q1I{<}TTC\_CI) \text{ and } (TTC\_Q2I{>}TTC\_CI)$$

Step 1.7

In step 1.7. all the collision points for which the major risk collision point condition is satisfied are being sent to an actuation unit in order to take a decision on the actions to be taken by the driver, by the ego vehicle or by both of them.

In other embodiments, different degrees of collision risk are defined by discretizing the one or more areas of major collision risk into corresponding one or more sub-areas of major collision risk with different degrees of collision risk.

When discretizing the one or more areas of major collision risk the collision points determined in step 1.6 of the method correspond to each of the or more discretized areas of major collision risk, reason for which the collision points are individualized separately for each discretized area and sent individualized separately in step 1.7. in order to enable the actuation unit to take different measures corresponding to each different degree of collision risk of each sub-area of major collision risk.

The discretization of the one or more areas of major collision risk has the advantage of responding to custom needs arising from real life.

Taking again the example of FIG. 1b, two roughly equal discretized areas of major collision risk are defined: one adjacent to the B-pillar of higher risk and the other one adjacent to the A-pillar of lower risk.

In the embodiments where there are more areas of major collision risk, such as the ones depicted in FIG. 1a, a rank of importance of the two or more areas of major collision risk is set. The areas of major collision risk placed on the lateral sides of the ego vehicle are considered to be of major importance than the areas placed at the front and at the rear of the ego vehicle.

In a second aspect of the present disclosure, it is presented a method of deceleration of the ego vehicle using the input from the method of calculation.

Figure 6:
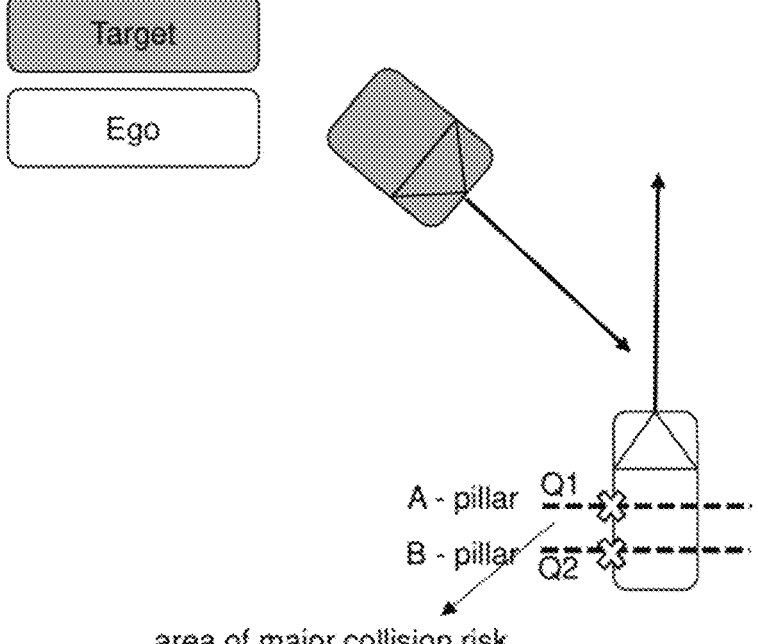
FIG. 6 illustrates schematically the driving of the target vehicle before the collision with the ego vehicle.
Figures 7, 8:
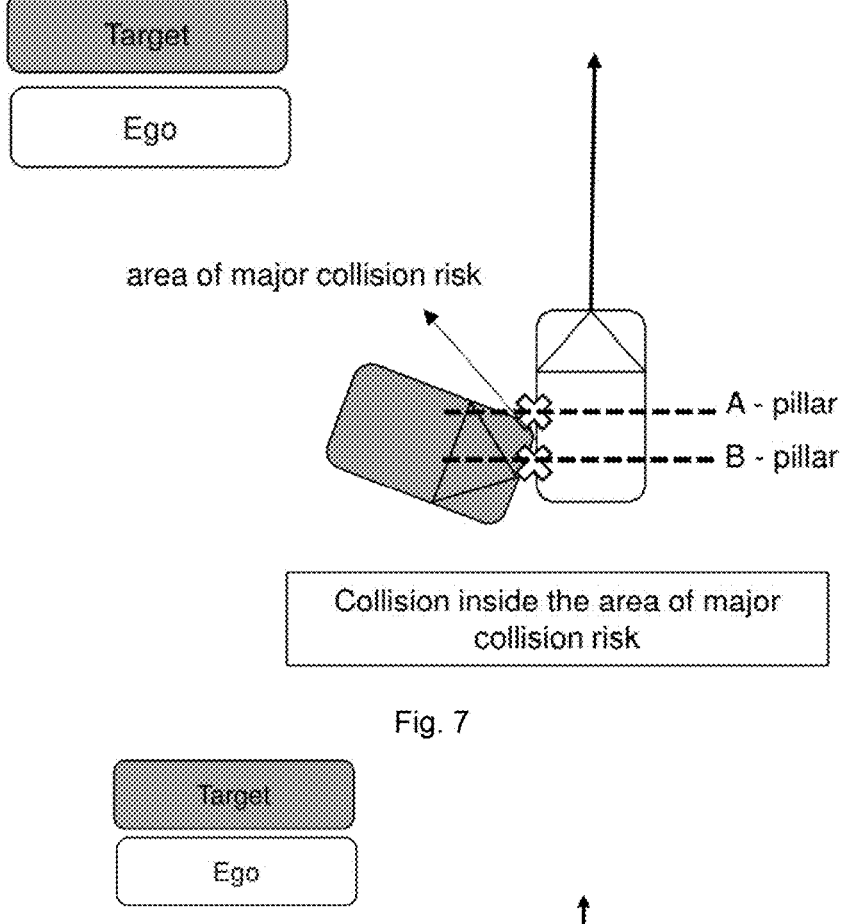
FIG. 7 illustrates schematically the impact of the collision in the absence of the method of the second aspect of the present disclosure.
FIG. 8 illustrates schematically the impact of the collision by applying the method of the second aspect of the present disclosure.

The method of the second aspect of the invention is based on the concept illustrated schematically in FIG. 6, FIG. 7 and FIG. 8.

In FIG. 6 it is presented the scene before the collision of the ego vehicle with the target vehicle. It is seen how the target vehicle is driving with high speed towards the ego vehicle.

In FIG. 7, it is assumed that the ego vehicle's advanced driver assistance systems takes the response as in the prior art, that is applies full brake. The target vehicle will collide with the ego vehicle with the point of collision situated exactly between the A-pillar and B-pillar, that is in one of the ego vehicle's most vulnerable places.

In FIG. 8, the ego vehicle applies the emergency brake assist deceleration method of the present disclosure, namely it applies a smaller brake deceleration as compared with the scenery of FIG. 7, and hence, the travelled distance from the ego vehicle current position to the predicted crash position is larger, consequently the collision point, instead of being situated between the A-pillar and B-pillar, it will be situated beyond the B-pillar which reduces the consequences of the crash at least in respect to the driver or the front passenger.

The method of emergency brake assist deceleration of the second aspect of the present disclosure is carried out by an actuation unit of the ego vehicle and includes four steps.

Step 2.1

In step 2.1. the actuation unit defines a plurality of levels of deceleration, each level of deceleration corresponding to one of the areas of major collision risk. All the levels of deceleration are lower than the maximum deceleration allowed for the ego vehicle.

Step 2.2

In step 2.2., the actuation unit sets an activation threshold to activate the method when the actuation unit receives from the collision point processing unit the collision points for which the major risk collision point condition is satisfied.

This means that in the absence of receiving data from the collision point processing unit, the method of emergency brake assist deceleration of the second aspect of the present disclosure is not carried out. Only then the activation unit receives the collision points satisfying the condition of the major risk condition the method is activated.

Step 2.3

In step 2.3., once the activation threshold is activated, the actuation unit selects from the plurality of levels of deceleration the level of deceleration corresponding to one of the areas of major collision risk for which the major risk collision point condition is satisfied.

Step 2.4

Finally, in step 2.4. the actuation unit applies the selected level of deceleration.

In some situations, it is convenient to discretize the levels of deceleration, that is to assign more than one level of deceleration to each area of major collision risk.

Therefore, in an embodiment, the discretization of the levels of deceleration is carried out corresponding to the discretization of the one or more areas of major collision risk into corresponding one or more sub-areas of major collision risk.

For the embodiments where two or more areas of major collision risk are defined, when the activation threshold is activated simultaneously for all areas of major collision risk, the selected level of deceleration applied corresponds to the higher ranked area of major collision risk.

The wide range of possibilities of discretization and the prioritization of the levels of deceleration mentioned above have the advantage that offer flexibility to adapt to the variety of situations of real life.

In a third aspect of the present disclosure, it is presented a collision point processing unit including one or more processors, at least one non-volatile memory and a first non-transitory computer-readable storage medium, the collision point processing unit being configured to perform operations of the method of calculation of a collision point between an ego vehicle and one or more target vehicles of any embodiment.

In a fourth aspect of the present disclosure, it is presented an actuation unit including one or more processors, at least one non-volatile memory, at least one emergency brake actuator and a second non-transitory computer-readable storage medium, wherein the actuation unit is configured to perform operations of the method emergency brake assist deceleration of an ego vehicle of any embodiment.

Both the collision point processing unit and the actuation unit are pieces of data processing hardware. Non limiting examples of data processing hardware are: controllers or electronic control units.

The communication between the collision point processing unit and the actuation unit uses communication protocols according to prior art.

In a fifth aspect of the present disclosure, it is presented a first non-transitory computer-readable storage medium encoded with a first computer program, the first computer program including instructions executable by one or more processors of the collision point processing unit which, upon such execution by the collision point processing unit, causes the one or more processors to perform operations of the method of calculation of a collision point between an ego vehicle and one or more target vehicles of any embodiment.

In a sixth aspect of the present disclosure, it is presented a second non-transitory computer-readable storage medium encoded with a second computer program, the second computer program including instructions executable by one or more processors of the actuation unit which, upon such execution by the actuation unit, causes the one or more processors to perform operations of the method emergency brake assist deceleration of an ego vehicle of any embodiment.

In a seventh aspect of the present disclosure, it is presented a system, including a collision point processing unit, an actuation unit, a sensor unit of an ego vehicle comprising a plurality of sensors, the system configured to apply the method of calculation of a collision point between an ego vehicle and one or more target vehicles of any embodiment and the method of emergency brake assist deceleration of any embodiment.

The system of the present disclosure has the advantage that it can be interconnected with other drive assist solutions of the ego vehicle.

While certain embodiments of the present invention have been described in detail, those familiar with the art to which this invention relates will recognize various alternative designs and embodiments for practicing the invention as defined by the following claims.

LIST OF REFERENCE SIGNS

Ego vehicle  
A—pillar  
B—pillar  
C—pillar  
D— pillar  
Area of major collision risk  
Target vehicle  
I intersection point  
C target intersecting point  
Q1 first ego vehicle intersecting point  
Q2 second ego vehicle intersecting point

The invention claimed is:

1. A method of calculation of a collision point between an ego vehicle and one or more target vehicles, the method comprising:

defining, by a collision point processing unit, one or more areas of major collision risk of an ego vehicle, each of the one or more areas of major collision risk delineated by a corresponding pair of a first and a second substantial verticals positioned on a respective pair of two opposite sides of the ego vehicle, wherein the first and second substantial verticals comprise pillar structural elements of the ego vehicle and are generally positioned parallel to each other, defining, by the collision point processing unit, a prediction of the movement of the ego vehicle and of a plurality of surrounding traffic participants during a pre-determined prediction time period, filtering out, by the collision point processing unit, the surrounding traffic participants that are unlikely to collide with the ego vehicle during the pre-determined prediction time period, a remainder of the traffic participants being one or more target vehicles, determining, by the collision point processing unit, for each target vehicle a target intersecting point as one of four corners of the target vehicle that is most likely to collide with the ego vehicle, and an intersection point defined by a prolongation line of a side of ego vehicle intersected with the prolongation line of a side of the target vehicle on the respective intersecting sides of the two vehicles, and, simultaneously, determining, by the collision point processing unit, in respect to each target vehicle a first ego vehicle intersecting point and a second ego vehicle intersecting point, the first ego vehicle intersecting point positioned on the ego vehicle and corresponding to the first substantial vertical on the vehicle positioned nearest to the intersection point and the second ego vehicle intersecting point positioned on the ego vehicle and corresponding to the second substantial vertical on the vehicle positioned farthest from the intersection point, calculating, by the collision point processing unit, for each target vehicle:

a first time to collision for the first ego vehicle intersecting point to reach the intersection point, a second time to collision for the second ego vehicle intersecting point to reach the intersection point, and a third time to collision for the target intersection point to reach the intersection point, applying, by the collision point processing unit, a major risk collision point condition, the collision point is inside one of the areas of the ego vehicle if the major risk collision point condition is satisfied, wherein the first time to collision for the first ego vehicle intersecting point to reach the intersection point is less than the third time to collision for the target intersection point to reach the intersection point, and wherein the second time to collision for the second ego vehicle intersecting point to reach the intersection point is greater than the third time to collision for the target intersection point to reach the intersection point, and sending to an actuation unit all the collision points for which the major risk collision point condition is satisfied wherein the actuation unit determines an operational adjustment to a vehicular component based at least in part upon the collision points and applies the operational adjustment to the vehicular component.

2. The method of claim 1, wherein the one or more areas of major collision risk are defined in respect to a longitudinal axis of the ego vehicle.

3. The method of claim 1, wherein the one or more areas of major collision risk are defined in respect to a transverse axis of the ego vehicle.

4. The method of claim 1, wherein the one or more areas of major collision risk are defined in respect to the longitudinal axis and one or more areas of major collision risk are defined in respect to the transverse axis of the ego vehicle.

5. The method of claim 1, wherein the first and the second substantial verticals support the ego vehicle's roof.

6. The method of claim 1, wherein different degrees of collision risk are defined by discretizing the one or more areas of major collision risk into corresponding one or more sub-areas of major collision risk with different degrees of collision risk, and wherein the collision points corresponding to each of the or more discretized areas of major collision risk are individualized separately for each discretized area.

7. A method of emergency brake assist deceleration of an ego vehicle using the method for calculating the collision point between the ego vehicle and one or more target vehicles of claim 1, the method of emergency brake assist carried out by an actuation unit and comprising:

defining a plurality of levels of deceleration, each level of deceleration corresponding to one of the areas of major collision risk and each level of deceleration is lower than a maximum deceleration, setting an activation threshold to activate the method of emergency brake assist when the actuation unit receives from the collision point processing unit the collision points for which the major risk collision point condition is satisfied, when the activation threshold is activated, selecting from the plurality of levels of deceleration a level of deceleration corresponding to one of the areas of major collision risk for which the major risk collision point condition is satisfied, and applying the selected level of deceleration.

8. The method of emergency brake assist deceleration of claim 7, wherein in case one or more areas of major collision risk are discretized into corresponding one or more sub-areas of major collision risk, the plurality of levels of deceleration is discretized.

9. A collision point processing unit comprising one or more processors, at least one non-volatile memory and a first non-transitory computer-readable storage medium, wherein the collision point processing unit is configured to perform operations of the method of calculation of the collision point between the ego vehicle and the one or more target vehicles of claim 1.

10. An actuation unit comprising one or more processors, at least one non-volatile memory, at least one emergency brake actuator and a second non-transitory computer-readable storage medium, wherein the actuation unit is configured to perform operations of the method emergency brake assist deceleration of the ego vehicle according to claim 7.

11. A non-transitory computer-readable storage medium encoded with a first computer program, the computer program comprising instructions executable by one or more processors of the collision point processing unit which, upon such execution by the collision point processing unit, causes the one or more processors to perform operations of the method of calculation of the collision point between the ego vehicle and the one or more target vehicles of claim 1.

12. A non-transitory computer-readable storage medium encoded with a computer program, the computer program comprising instructions executable by one or more processors of the actuation unit which, upon such execution by the actuation unit, causes the one or more processors to perform operations of the method of emergency brake assist deceleration of the ego vehicle according to claim 7.

13. A system, comprising:

a collision point processing unit of an ego vehicle, an actuation unit of the ego vehicle, a sensor unit of the ego vehicle comprising a plurality of sensors, wherein the collision point processing unit is configured to apply the method of calculation of the collision point between the ego vehicle and the one or more target vehicles of claim 1.

\* \* \* \* \*